United States Patent Office 3,714,045
Patented Jan. 30, 1973

3,714,045
LUBRICANT COMPOSITIONS
Gerassimos Frangatos, Westmont, N.J., assignor to
Mobil Oil Corporation, New York, N.Y.
No Drawing. Filed Aug. 5, 1970, Ser. No. 61,519
Int. Cl. C10m 1/32
U.S. Cl. 252—51.5 A                  9 Claims

ABSTRACT OF THE DISCLOSURE

Lubricants are stabilized against oxidative deterioration by adding thereto a small amount of a product produced from a primary arylamine and an alpha-olefin-maleic anhydride heteropolymer.

BACKGROUND OF THE INVENTION

Field of the invention

This invention relates to lubricant compositions having improved stability properties. More particularly, the invention relates to lubricants to which have been added small amounts of an additive which has the ability to reduce oxidative deterioration thereof.

Discussion of the prior art

It is well known that lubricants tend to oxidize when exposed to adverse storage conditions or in actual use. In internal combustion engines, for example, such oxidation is accelerated by the high temperatures to which the lubricant is subjected. Deterioration of the lubricant in this type of service results in the formation of gums and sludges which clog the feed lines and form varnish-like deposits on the operating surfaces. These deposits at the very least decrease the efficiency of the engine, and in aggravated cases may lead to a totally inoperative machine.

It is known in the art that products produced by reacting an alkenylsuccinic acid anhydride with an amine may be added to lubricants, mainly to inhibit runst formation and to impart detergency thereto. Thus, U.S. 2,490,744 discloses lubricant additives made by reacting a $C_{10}$–$C_{12}$ alkenylsuccinic acid anhydride with certain amines, particularly primary amines. It is broadly disclosed that the amine may be an aryl amine.

In addition, U.S. Pats. 3,219,666 and 3,272,746 disclose lubricant compositions containing reaction products of alkenylsuccinic acid anhydrides, where the alkenyl group has at least 50 carbon atoms, and an amine, particularly polyalkylene polyamines. These two patents also teach broadly that aromatic amines may be used.

The alkenylsuccinic acid anhydrides taught by the patents mentioned are obtained by the simple condensation of an olefin with maleic anhydride. It will become evident from the disclosure given hereinbelow that the olefin-maleic anhydride products used herein are not condensation products. They are made under entirely different conditions, i.e., using a free radical initiator, and are thus heteropolymers of the reactants.

SUMMARY OF THE INVENTION

The invention provides a lubricant composition comprising a major amount of a lubricant and an amount sufficient to impart stability properties thereto of a polyimide produced by reacting (1) a heteropolymer produced by reacting an $\alpha$-olefin with maleic anhydride in the presence of a free-radical initiator with (2) a primary arylamine.

DESCRIPTION OF SPECIFIC EMBODIMENTS

The products of this invention are polymeric imides made by reacting a heteropolymer of maleic anhydride and an $\alpha$-olefin with an aromatic amine. With reference to the heteropolymer, there are free anhydride groups along the polymeric chain and the number of these is proportional to the amounts of maleic anhydride and olefin which are co-reacted. For example, when equimolar amounts of maleic anhydride and olefin are co-polymerized, the olefin and anhydride portions alternate in the copolymer chain. In the chain, the heteropolymer is made up of recurring units having the structure

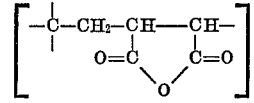

The aromatic amine reacts with the anhydride portion of the heteropolymer substantially as follows:

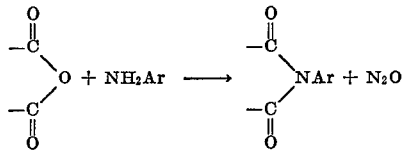

In its preferred form, the heteropolymer is reacted with sufficient amine to form an imide with each anhydride unit along the polymer chain.

While the above refers to equimolar quantities of maleic anhydride and $\alpha$-olefin (i.e., a 1:1 ratio), and while such ratio is actually preferred in preparing heteropolymers for use in this invention, heteropolymers made where the molar ratios of reactants range from 1:1 to 1:50 are also useful. In this regard, it is apparent that the physical properties of the heteropolymer will vary depending upon the $\alpha$-olefin and molar ratio selected, but such properties will not affect the subsequent reaction of the heteropolymer with the arylamine.

The reaction between maleic anhydride and compounds containing a double bond, e.g., vinylidines, in the presence of peroxides is well known. The reaction to form the heteropolymers of this invention is similar. Generally, maleic anhydride, olefin and peroxide, such as di-tertiary butyl peroxide or benzoyl peroxide, are simply placed together in an inert organic solvent and the reaction mixture is heated at reflux for the time necessary to complete the polymerization.

Similarly, the polyimide may be made by mixing heteropolymer and arylamine in an inert organic solvent and refluxing for from about 1 to about 24 hours, depending upon the olefin and solvent, to complete the reaction. For purposes of this reaction, the high boiling solvents, such as xylene, Tetralin, nitrobenzene, biphenyl and the like are preferred.

The olefins to be used in preparing the heteropolymer include an $\alpha$-monoolefin having from 2 to about 50 carbon atoms. Within this range, the preferred members are those having from 10 to about 30 carbon atoms and more preferably from 12 to about 20 carbon atoms.

Within this latter group are dodecene, tridecene, tetradecene, octadecene and eicosene. Another class of useful olefins are the polyolefins having a terminal double bond. There may be mentioned in this class polymers from ethylene, butene, decene and the like. Such polymers may have molecular weights of up to about 1000.

The arylamines contemplated are primary aryl amines of the formula

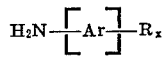

wherein Ar is an aryl or arylene group having from 1 to 7 rings, R is alkyl, aryl, alkaryl, aralkyl, halo (e.g., chloro, bromo, iodo, fluoro), amino or nitro, and $x$ is 0 to the positions available on Ar. When $x$ is zero "Ar" is an aryl. In other words, R is hydrogen when $x$ is zero. The groups defined by R may have from 1 to about 30 carbon atoms. Included among the compounds defined by the above formula are phenylamine, naphthylamine, anthrylamine, phenanthrylamine, tolylamines, xylylamines, ethylphenylamine, butylnaphthylamine, octylphenylamine, dodecylphenylamine, biphenylamine, benzidine, chlorophenylamine, bromophenylamine, nitrophenylamine, phenylenediamine, naphthylenediamine and the like.

It will be understood when referring to Ar in the above formula that the aryl or arylene group may comprise a single ring, one or more rings joined at single carbons in each ring, e.g., diphenyl, or up to the stated number of fused rings.

The polyimides of this invention may be used, as has already been indicated, as antioxidants for lubricants. When so used, the amount thereof which will give effective antioxidant activity will range from about 0.01 to about 10% by weight of the lubricant. Preferably the amount will vary between about 0.5 and about 5% by weight.

The lubricants which may be improved by such polyimides are mineral and synthetic lubricating oils and greases made therefrom. The mineral oils will be understood to embrace not only the paraffinic, but also the naphthenic members. By synthetic oils are meant synthetic hydrocarbons, polyalkylene oxide oils, polyacetals, polysilicones and the like, as well as synthetic ester oils. Of the latter type there may be mentioned those esters made from monohydric alcohols and polycarboxylic acids, such as 2-ethylhexyl azelate and the like, and those made from polyhydric alcohols and aliphatic monocarboxylic acids. Those of this group are especially important, and they include esters prepared from the trimethylols, such as the ethane, propane and butane derivatives thereof, 2,2-disubstituted propane diols and the pentaerythritols with aliphatic monocarboxylic acids containing from about 4 to about 9 carbon atoms. Mixtures of these acids may be used to prepare the esters. Preferred in the practice of this invention are the esters prepared from a pentaerythritol and a mixture of $C_5$–$C_9$ acids. In making such esters, a generally acceptable product can be made from commercial pentaerythritol containing about 88% of monopentaerythritol and 12% dipentaerythritol.

Having described the invention in general terms, the following is offered as a specific embodiment thereof. It will be understood that the example is merely for the purpose of illustration, and that there is no intention to limit the scope of the invention to the member shown.

EXAMPLE 1

Preparation of the heteropolymer

Into 300 ml. of xylene were placed 49 g. (0.5 mole) of maleic anhydride, 126 g. (0.5 mole) of 1-octadecene and 5 g. of ditertiarybutyl peroxide. The reaction mixture was refluxed and stirred under nitrogen for a period of 5 hours. Yield of product was 68% based on the maleic anhydride.

Preparation of the polyimide

A mixture of 35 g. (0.1 mole) of the above heteropolymer, 14.3 g. (0.1 mole) of α-naphthylamine and 250 ml. of xylene were placed in a flask. The reaction mass was brought to reflux. After recovery of about 0.8 ml. of water, gradual removal of the xylene was begun. As the xylene was removed, the temperature of the reaction medium was gradually increased, and such increase was continued until a temperature of 205° C. was reached. 49.2 g. of product was recovered.

EVALUATION OF PRODUCTS

The compounds produced in accordance with this invention were blended into a synthetic ester oil lubricant (made by reacting pentaerythritol with an equimolar mixture of $C_5$ and $C_9$ monocarboxylic acids) and tested in an oxidation test in accordance with the following procedure.

A sample of the test composition is heated and air at the rate of about 5 liters per hour is passed through for a period of about 24 hours. Present in the test sample are specimens of iron, copper, aluminum, and lead. It should be noted that the metals are typical metals of engine or machine construction, and they also provide some catalysts for the oxidation of organic materials. The neutralization number (NN) measures the amount of acidity in the oil. The percent change in viscosity (ΔKV, percent) occurring as a result of the test conditions is determined from the initial and final measurements at 100° F. The results, tabulated in the following table, concern the product of Example 1.

| Base | Additive, percent | Temperature, °F. | Initial NN | final NN | ΔNN | Initial KV | final KV | ΔKV, percent |
|---|---|---|---|---|---|---|---|---|
| PE [1] | | 425 | 0.1 | 9.5 | 9.4 | 26.69 | 98.97 | 270.81 |
| | | 450 | 0.1 | 10.7 | 10.6 | 26.69 | 206.0 | 671.82 |
| PE [2] | | 450 | 0.1 | 8.6 | 8.5 | 27.86 | 57.21 | 105.35 |
| PE [1] | 3 | 425 | 0.66 | 1.40 | 0.74 | 30.13 | 56.26 | 86.72 |
| | 3 | 450 | 0.66 | 1.40 | 0.74 | 30.13 | 43.43 | 44.14 |
| PE [2] | 3 | 450 | 0.81 | 3.10 | 2.29 | 31.34 | 43.04 | 37.33 |

[1] This is the pentaerythritol ester described in the procedure.
[2] This is the same pentaerythritol ester having therein about 4% of a mixture of an arylamine antioxidant, an antiforming agent, an antiwear agent and a metal scavenger.

The data in the above table show a great increase in antioxidation stability of a lubricating oil. This is apparent from the large reduction in neutralization number change and in the percent change in viscosity. It is well known in the art that these will increase in a lubricant prone to oxidative deterioration.

I claim:

1. A lubricant composition comprising a major amount of a lubricant and an amount sufficient to impart stability properties thereto of a polyimide produced by reacting (1) a heteropolymer produced by reacting an α-monoolefin having from about 2 to about 50 carbon atoms with maleic anhydride in the presence of a free radical initiator such that the molar ratio of maleic anhydride to α-olefin is within the range of from 1:1 to 1:50 with (2) one equivalent per equivalent of said heteropolymer of a primary arylamine selected from the group consisting of naphthylamine, butylnaphthylamine and phenanthrylamine.

2. The composition of claim 1 wherein said polyamide is present in an amount of from about 0.01 to about 10% by weight of said lubricant.

3. The composition of claim 1 wherein the α-olefin is 1-octadecene.

4. The composition of claim 1 wherein the arylamine is naphthylamine.

5. The composition of claim 1 wherein the lubricant is selected from the group consisting of lubricating oils and greases.

6. The composition of claim 5 wherein the lubricating oil is a mineral oil.

7. The composition of claim 5 wherein the lubricating oil is a synthetic ester oil.

8. The composition of claim 7 wherein the synthetic ester oil is one prepared from pentaerythritol and an equimolar mixture of $C_5$ and $C_9$ aliphatic monocarboxylic acids.

9. The composition of claim 1 wherein the olefin is 1-octadecene, the arylamine is naphthylamine and the lubricant is a synthetic ester.

References Cited

UNITED STATES PATENTS

| | | | |
|---|---|---|---|
| 2,977,334 | 3/1961 | Zopf et al. | 252—56 D |
| 3,306,852 | 2/1967 | Hendrickson | 252—51.5 A |
| 3,432,479 | 3/1969 | Verdol et al. | 252—51.5 A |
| 3,455,827 | 7/1969 | Mehmedbasich et al. | 252—51.5 A |

DANIEL E. WYMAN, Primary Examiner

W. J. SHINE, Assistant Examiner

U.S. Cl. X.R.

252—403; 260—78.5 T